United States Patent
Yang

(10) Patent No.: US 10,708,927 B2
(45) Date of Patent: Jul. 7, 2020

(54) DATA TRANSMISSION METHOD AND DEVICE

(71) Applicant: Guangdong OPPO Mobile Telecommunications Corp., Ltd., Dongguan, Guangdong (CN)

(72) Inventor: Ning Yang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/312,753

(22) PCT Filed: Sep. 23, 2016

(86) PCT No.: PCT/CN2016/099870
§ 371 (c)(1),
(2) Date: Dec. 21, 2018

(87) PCT Pub. No.: WO2018/053805
PCT Pub. Date: Mar. 29, 2018

(65) Prior Publication Data
US 2019/0268913 A1    Aug. 29, 2019

(51) Int. Cl.
| | | |
|---|---|---|
| *H04W 12/00* | (2009.01) | |
| *H04W 72/08* | (2009.01) | |
| *H04B 17/318* | (2015.01) | |
| *G01S 19/01* | (2010.01) | |
| *H04W 48/20* | (2009.01) | |

(Continued)

(52) U.S. Cl.
CPC ........... *H04W 72/085* (2013.01); *G01S 19/01* (2013.01); *H04B 17/318* (2015.01); *H04W 4/40* (2018.02); *H04W 48/20* (2013.01); *H04W 28/16* (2013.01); *Y02D 70/00* (2018.01)

(58) Field of Classification Search
CPC .... H04B 17/318; H04W 28/16; H04W 48/20; H04W 4/40; H04W 72/085
See application file for complete search history.

(56) References Cited

U.S. PATENT DOCUMENTS

2015/0223084 A1*   8/2015  Lightstone ............ H04W 24/08
                                                             370/252

FOREIGN PATENT DOCUMENTS

| CN | 103747507 A | 4/2014 |
| CN | 104936133 A | 9/2015 |
| CN | 105246025 A | 1/2016 |

(Continued)

OTHER PUBLICATIONS

3rd Generation Partnership Project; Technical Specification Group Services and System Aspects; Study on LTE support for Vehicle to Everything (V2X) services (Release 14).

(Continued)

*Primary Examiner* — Phuc H Tran
(74) *Attorney, Agent, or Firm* — Young Basile Hanlon & MacFarlane, P.C.

(57) ABSTRACT

A data transmission method and a device are provided. The method includes: a first device receives a first signal sent by a second device; and the first device determines whether to send data according to the first signal. According to the data transmission method and device, the first device sends data according to the first signal received from the second device, for example, sends data when the signal is stronger than a certain threshold value.

17 Claims, 1 Drawing Sheet

(51) Int. Cl.
*H04W 4/40* (2018.01)
*H04W 28/16* (2009.01)

(56) References Cited

FOREIGN PATENT DOCUMENTS

| CN | 105430751 A | 3/2016 |
|----|-------------|--------|
| WO | 2015054489 A1 | 4/2015 |
| WO | 2016139555 A1 | 9/2016 |

OTHER PUBLICATIONS

EP Extended Search Report Apr. 18, 2019.

\* cited by examiner

DATA TRANSMISSION METHOD AND DEVICE

CROSS-REFERENCE TO RELATED APPLICATION(S)

This application is a 371 application of International Application No. PCT/CN2016/099870, filed on Sep. 23, 2016, the entire disclosure of which is hereby incorporated by reference.

TECHNICAL FIELD

The present disclosure relates to the field of communications, in particular to a data transmission method and device.

BACKGROUND

With the rising of smart vehicles, V2X are introduced in 3rd Generation Partnership Project (3GPP) to support future vehicle related services. The V2X services may be categorized as Vehicle-to-Vehicle (V2V), Vehicle-to-Network (V2N) and Vehicle-to-Person (V2P) according to application scenarios of the V2X services.

At present, an enhanced mode based on direct communication between terminals (D2D) is adopted to support the Vehicle-to-Vehicle (V2V). For Vehicle-to-Network (V2N), there is no obvious difference from the communication mode between a cell phone and a cellular network. For Vehicle-to-Person (V2P), most of the communication technologies may adopt the communication mode of the Vehicle-to-Vehicle (V2V). Since vehicles in the Vehicle-to-Vehicle (V2V) communication are not sensitive to power consumption, the power consumption optimization is not considered. However in the Vehicle-to-Person (V2P) communication, due to the participation of hand-held terminals (i.e. normal cell phone), the power saving issue should be solved.

SUMMARY

The present application provides a data transmission method and device. In a first aspect, a data transmission method is provided. The method includes: a first device receives a first signal sent by a second device; and the first device determines whether to send data according to the first signal.

In combination with the first aspect, in an implementation of the first aspect, receiving by the first device the first signal sent by the second device includes: the first device determines position information and/or signal strength information; and the first device receives the first signal sent by the second device according to the position information and/or signal strength information. Herein, the position information is used for indicating a position of the first device; and the signal strength information is used for indicating strength of a second signal received by the first device.

In combination with the first aspect and the above implementation, in another implementation of the first aspect, determining by the first device the position information includes the first device determines the position information according to a global positioning system (GPS) and/or a speed of the first device.

In combination with the first aspect and the above implementations, in another implementation of the first aspect, receiving by the first device the first signal sent by the second device according to the position information includes: the first device determines a distance between the first device and the second device according to the position information; and the first device receives the first signal sent by the second device when determining that the distance between the first device and the second device is less than or equal to a first threshold.

In combination with the first aspect and the above implementations, in another implementation of the first aspect, the second signal is a GPS signal received by the first device, or the second signal is a signal sent by a Road Side Unit (RSU), or the second signal is a signal sent by a base station. Herein the RSU is an RSU of a terminal type or an RSU of a base station type.

In combination with the first aspect and the above implementations, in another implementation of the first aspect, receiving by the first device the first signal sent by the second device according to the signal strength information includes: the first device receives the first signal sent by the second device when the first device determines that the strength of the second signal is larger than or equal to a second threshold.

In combination with the first aspect and the above implementations, in another implementation of the first aspect, determining by the first device whether to send data according to the first signal includes: the first device sends the data to the second device when the signal strength of the first signal is larger than or equal to a third threshold; the first device does not send the data to the second device when the signal strength of the first signal is less than the third threshold.

In combination with the first aspect and the above implementations, in another implementation of the first aspect, sending by the first device the data to the second device includes the first device sends the data to the second device periodically according to a preset period value.

In combination with the first aspect and the above implementations, in another implementation of the first aspect, the method further includes: receiving by the first device at least one period value sent by a network device; and the first device determines the preset period value from the at least one period value according to the signal strength of the first signal or the distance between the first device and the second device.

In combination with the first aspect and the above implementations, in another implementation of the first aspect, sending by the first device the data to the second device includes: the first device sends the data to the second device according to resource information or resource pool information configured by the network device.

In combination with the first aspect and the above implementations, in another implementation of the first aspect, receiving by the first device the first signal sent by the second device includes: the first device receives the first signal sent by the second device according to resource information or resource pool information configured by the network device.

In combination with the first aspect and the above implementations, in another implementation of the first aspect, the first device is a user terminal, and the second device is a vehicle terminal or an RSU.

In a second aspect, a data transmission device is provided. The data transmission device is configured to implement the method in the first aspect or in any possible implementation of the first aspect described above. Specifically, the device includes units for implementing the method in the first aspect or in any possible implementation of the first aspect described above.

In a third aspect, a data transmission device is provided. The data transmission device includes: a storage device and a processor. The storage device is configured to store instructions, and the processor is configured to execute the instructions stored in the storage device, and when the processor executes the instructions stored in the storage, the execution causes the processor to execute the method in the first aspect or in any possible implementation of the first aspect.

In a fourth aspect, a computer readable medium is provided. The computer readable medium is used for storing a computer program including instructions for executing the method in the first aspect or in any possible implementation of the first aspect.

BRIEF DESCRIPTION OF DRAWINGS

To describe the technical schemes of implementations of the present disclosure more clearly, accompanying drawings that are referred to in implementations of the present disclosure will be briefly described below. It is apparent that the accompanying drawings described below are only some implementations of the present disclosure; and for a person of ordinary skill in the art, other drawings may be obtained according to these drawings without creative efforts.

DETAILED DESCRIPTION

The technical solutions in implementations of the present disclosure will be described clearly and completely below with reference to the accompanying drawings in the implementations of the present disclosure. It is apparent that the described implementations are part, but not all, implementations of the present disclosure. All other implementations obtained by those of ordinary skill in the art based on the implementations of the present disclosure without creative efforts shall fall within the protection scope of the present disclosure.

The technical solutions of implementations of the present disclosure may be applied to various communication systems, such as a Global System of Mobile Communication (GSM) system, Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD) system, Universal Mobile Telecommunication System (UMTS), Worldwide Interoperability for Microwave Access (WiMAX) communication system, and future 5G system.

Figure 1:
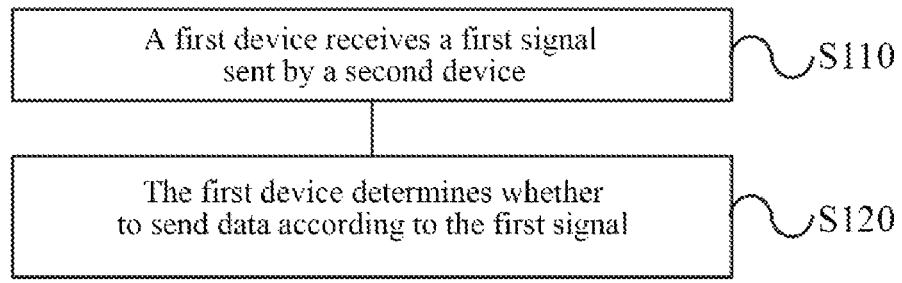
FIG. 1 is a schematic flowchart of a data transmission method according to an implementation of the present disclosure.

FIG. 1 shows a schematic flowchart of a data transmission method 100 according to an implementation of the present disclosure. It should be understood that the method 100 may be applied to an Internet of Vehicles technology, such as a vehicle-to-person (V2P) communication scenario, which includes a vehicle terminal and a user terminal, and may also include a network device. Specifically, the vehicle terminal may directly perform information interchange with the user terminal, or the vehicle terminal may perform information interchange with the user terminal via the network device, i.e., the vehicle terminal may perform information interchange with the network device, and the user terminal may also perform information interchange with the network device.

Optionally, the vehicle terminal in the V2P scenario may refer to any vehicle. The vehicle terminal may be a self-driving vehicle, or a manual driving vehicle, and implementations of the present disclosure are not limited thereto. The user terminal in the V2P scenario may be a user hand-held terminal, including, but not limited to, a mobile telephone, a handset, a tablet computer, or a portable equipment, etc.

Optionally, the network device may be a base station, which may be a Base Transceiver Station (BTS) in GSM or CDMA, a NodeB in WCDMA, or an evolved NodeB (eNB or e-NodeB) in LTE, and the present disclosure is not limited thereto. The network device may otherwise be a Road Side Unit (RSU) capable of scheduling a vehicle terminal. Optionally, the RSU may be an RSU of a base station type or an RSU of a terminal type. The specific form of the RSU may be a device such as an intelligent traffic light, or a traffic sign board, and implementations of the present disclosure are not limited thereto.

In an implementation of the present disclosure, as shown in FIG. 1, the method 100 may be implemented by a first device which may refer to a user terminal in the V2P scenario. Specifically, the method 100 includes the following acts S110-S120.

In S110, the first device receives a first signal sent by a second device.

It should be understood that, the first device may be a user terminal in the V2P scenario, the second device may be a vehicle terminal in the V2P scenario, or may be a network device in the V2P scenario, such as an RSU, or a base station.

It should be understood that, in an example, the first device is a user terminal and the second device is a vehicle terminal, and the vehicle terminal may periodically or aperiodically send some signals, for example, the vehicle terminal may periodically send a detection signal, or send a signal carrying information related to the vehicle terminal. In the S110, the first signal may be a detection signal periodically sent by the vehicle terminal, or may be a signal carrying information related to the vehicle terminal, for example, a signal carrying signaling information of the vehicle terminal, or a signal carrying data information of the vehicle terminal, and implementations of the present disclosure are not limited thereto.

Optionally, if the second device is a network device, such as an RSU, the first signal may be any signal sent by the RSU.

It should be understood that, the first device may receive the first signal sent by the second device through a preconfigured resource. Optionally, the preconfigured resource may be preconfigured by the network device for the first device. Specifically, the first device may be a user terminal, and the network device may send resource indication information to the user terminal. Herein, the resource indication information is used for indicating information of resource or resource pool that may be used by the user terminal. According to the resource indication information, the user terminal receives the first signal sent by the second device through the resource indicated in the resource indication information or through any resource in the resource pool indicated in the resource indication information.

In an implementation of the present disclosure, the first device may determine whether to receive the first signal according to a preset rule. Specifically, the first device may determine whether to receive the first signal according to position information and/or signal strength information. The position information is used for indicating a position of the first device, and the signal strength information is used for indicating strength of a second signal received by the first device.

Optionally, as an implementation, if the first device is a user terminal, the user terminal may determine whether to receive the first signal according to the position information. Specifically, the position information may be used for indicating a position of the user terminal. The user terminal may determine a geographic position where the user terminal is located according to a positioning device, such as a Global Positioning System (GPS). When the user terminal determines that the user terminal is in outdoors, the user terminal may determine to receive the first signal sent by the second device. When the user terminal determines that the user terminal is in indoors, the user terminal does not receive the first signal sent by the second device.

Optionally, the user terminal may further determine a distance between the user terminal and the second device according to the geographic position where the user terminal is located. Or, the user terminal may further determine the distance between the user terminal and the second device according to the geographic position of the user terminal and the speed of the user terminal itself.

The user terminal may determine whether to receive the first signal according to the distance between the user terminal and the second device. Specifically, when the distance between the user terminal and the second device is less than or equal to a first threshold, that is, when the user terminal is relatively near to the second device, the user terminal receives the first signal sent by the second device. When the distance between the user terminal and the second device is larger than the first threshold, that is, when the user terminal is relatively far from the second device, the user terminal does not receive the first signal sent by the second device. Optionally, the first threshold may be determined according to an actual situation, for example, the first threshold may be preconfigured for the user terminal by the network device according to performance of the user terminal.

Optionally, as an implementation, if the first device is a user terminal, the user terminal may determine whether to receive the first signal according to signal strength information. Herein the signal strength information is used for indicating strength of a second signal received by the user terminal. Specifically, the user terminal receives the second signal, and the second signal may be a GPS signal; or the second signal may be a signal sent by some special device, for example, the second signal may be a signal sent by an RSU. Herein the RSU may be an RSU of a terminal type, or may be an RSU of a base station type. The second signal may be a signal sent by a base station; or the second signal may be other signals that the user terminal may receive, and implementations of the present disclosure are not limited thereto.

The user terminal determines whether to receive the first signal sent by the second device according to the signal strength of the second signal. Specifically, when the signal strength of the second signal is larger than or equal to a second threshold, the user terminal receives the first signal sent by the second device. When the signal strength of the second signal is less than the second threshold, the user terminal does not receive the first signal sent by the second device. Optionally, the second threshold may be configured according to an actual situation.

Optionally, as an implementation, if the first device is a user terminal, the user terminal may determine whether to receive the first signal sent by the second device according to position information and signal strength information. Specifically, the user terminal determines whether to receive the first signal of the second device according to a distance between the user terminal and the second device and the signal strength of a received second signal. For example, when the distance between the user terminal and the second device is less than or equal to a first threshold and the signal strength of the received second signal is larger than or equal to a second threshold, the user terminal receives the first signal sent by the second device, otherwise the user terminal does not receive the first signal sent by the second device, implementations of the present disclosure are not limited thereto.

It should be understood that the user terminal may determine by a higher layer to receive the first signal, the high layer may be an application layer, and notify a bottom layer to start a receiver of the user terminal to receive the first signal. The bottom layer may be an access layer.

In S120, the first device determines whether to send data according to the first signal.

In an implementation of the present disclosure, after the first device receives the first signal sent by the second device, the first device may determine whether to send data according to strength of the first signal. Specifically, when the strength of the first signal is larger than or equal to a third threshold, the first device sends data to the second device; when the strength of the first signal is less than the third threshold, the first device does not send data to the second device.

Optionally, the third threshold may be configured according to an actual situation, for example, the third threshold may be preconfigured by the network device.

It should be understood that, if the first device is a user terminal, when the user terminal determines to send data, the user terminal may periodically send data to the second device according to a preset period value. Optionally, the preset period value may be preconfigured for the user terminal by the network device. Specifically, the network device may send one or more period values to the user terminal. When the network device sends one period value to the user terminal, the period value is the preset period value, and the user terminal sends data to the second device according to the preset period value.

Optionally, the network device may send a plurality of period values to the user terminal, and the user terminal may determine a preset period value from the plurality of period values according to the strength of the received first signal or the distance between the user terminal and the second device, and send data to the second device according to the preset period value. For example, when signal strength of the first signal received by the user terminal is strong or the user terminal is near to the second device, the user terminal may select a small period value as the preset period value to send data to the second device, and the implementations of the present disclosure are not limited thereto.

In an implementation of the invention, the user terminal may send data to the second device through a preconfigured resource. Optionally, the preconfigured resource may be preconfigured for the user terminal by the network device. Specifically, the network device may send resource indication information to the user terminal. The resource indication information is used for indicating information of a resource or a resource pool that may be used by the user terminal. According to the resource indication information, the user terminal sends data to the second device through the resource indicated in the resource indication information or through any resource in the resource pool indicated in the resource indication information.

It should be understood that, the data sent by the user terminal to the second device may be used to indicate the user terminal, and the second device receives the data and may remind the vehicle terminal to mind the user terminal, and mind a pedestrian who holds the user terminal. For example, when the second device is a vehicle terminal, the vehicle terminal may remind the vehicle terminal to mind the user terminal according to the data received from the user terminal. The second device may be an RSU. The RSU receives the data sent by the user terminal, and reminds the surrounding vehicle terminals to mind the user terminal according to the data.

Optionally, the data sent by the user terminal to the second device may also be used for indicating other information related to the user terminal, such as a position, speed, or direction of the user terminal. The second device receives the data, and may make corresponding adjustments in time according to the data. For example, when the second device is a vehicle terminal, the second device may avoid a pedestrian who holds the user terminal in time; when the second device is an RSU, the second device may notify the vehicle terminals around the user terminal to avoid the pedestrian who holds the user terminal in time.

It should be understood that the term "and/or" in this disclosure is merely an association relationship describing associated objects, indicating that there may be three relationships, for example, A and/or B may include three situations: A alone, A and B at the same time, and B alone. In addition, the symbol "/" in this disclosure generally indicates that the objects before and after the symbol are in "or" relationship.

It should be understood that in various implementations of the present disclosure, the values of the sequence numbers of the above-described processes do not mean the order of execution, and the order of execution of each process should be determined by the function and internal logic of each process. The sequence numbers of the above-described processes should not constitute any limitation on the implementation processes of the implementations of the present disclosure.

Therefore, according to the data transmission method of implementations of the present disclosure, the user terminal may determine whether to receive the signal sent by the second device based on its own position information or the strength of a signal that can be received, and based on the signal received from the second device, send data when the signal is stronger than a certain threshold, thereby the energy consumption of the user terminal can be saved, and the energy saving effect of the user terminal can be improved.

The data transmission method according to implementations of the present disclosure is described in detail above with reference to FIG. 1. Data transmission devices according to implementations of the present disclosure will be described below with reference to FIGS. 2 to 3.

Figure 2:
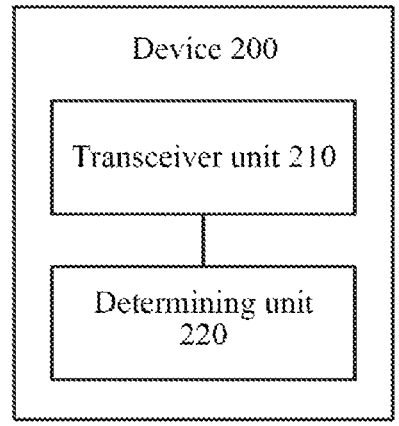
FIG. 2 is a block diagram of a data transmission device according to an implementation of the present disclosure.

As shown in FIG. 2, a data transmission device 200 according to an implementation of the present disclosure includes: a transceiver unit 210 and a determining unit 220.

The transceiver unit 210 is configured to receive a first signal sent by a second device.

The determining unit 220 is configured to determine whether to send data according to the first signal.

Therefore, the data transmission device according to the implementation of the present disclosure sends data according to the first signal received from the second device, for example, sends data when the signal is stronger than a certain threshold, thereby saving the energy consumption of the device and improving the energy saving effect of the device.

Optionally, the determining unit 220 is further configured to determine position information and/or signal strength information. The position information is used for indicating a position of the device, and the signal strength information is used for indicating strength of a second signal received by the device. The transceiver unit 210 is specifically configured to receive the first signal sent by the second device according to the position information and/or the signal strength information.

Optionally, the determining unit 220 is specifically configured to determine the position information according to a GPS and/or a speed of the device.

Optionally, the transceiver unit 210 is specifically configured to determine a distance between the device and the second device according to the position information; and receive the first signal sent by the second device when determining that the distance between the device and the second device is less than or equal to a first threshold.

Optionally, the second signal is a GPS signal received by the device, or the second signal is a signal sent by an RSU, or the second signal is a signal sent by a base station, wherein the RSU is an RSU of a terminal type or an RSU of a base station type.

Optionally, the transceiver unit 210 is specifically configured to receive the first signal sent by the second device when determining that the strength of the second signal is larger than or equal to a second threshold.

Optionally, the transceiver unit 210 is specifically configured to send the data to the second device when the signal strength of the first signal is larger than or equal to a third threshold; and not to send the data to the second device when the signal strength of the first signal is less than the third threshold.

Optionally, the transceiver unit 210 is specifically configured to periodically send the data to the second device according to a preset period value.

Optionally, the transceiver unit 210 is specifically configured to receive at least one period value sent by the network device. The determining unit 220 is specifically configured to determine a preset period value from the at least one period value according to the signal strength of the first signal or the distance between the device and the second device.

Optionally, the transceiver unit 210 is specifically configured to send the data to the second device according to resource information or resource pool information configured by the network device.

Optionally, the transceiver unit 210 is specifically configured to receive the first signal sent by the second device according to the resource information or the resource pool information configured by the network device.

Optionally, the device 200 is a user terminal, and the second device is a vehicle terminal or an RSU.

It should be understood that, the data transmission device 200 according to the implementation of the present disclosure may correspond to the first device performing the method 100 in the implementations of the present disclosure, and the above and other operations and/or functions of the various units in the device 200 are respectively for implementing the corresponding procedures of the method in FIG. 1, which are not repeated here for conciseness.

Therefore, the data transmission device according to implementations of the present disclosure determines whether to receive the first signal sent by the second device based on its own position information or the strength of a signal that can be received, and then sends data according to the first signal received from the second device, for example, sends data when the signal is stronger than a certain threshold. Therefore, the energy consumption of the user terminal can be saved, and the energy saving effect of the user terminal can be improved.

Figure 3:
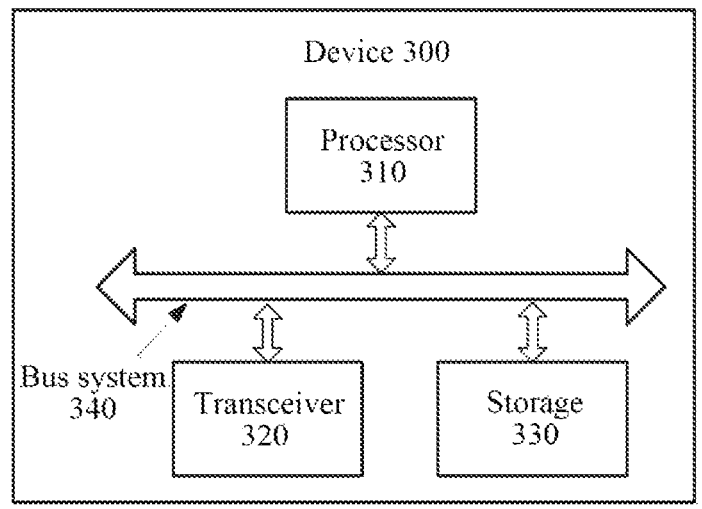
FIG. 3 is a block diagram of a data transmission device according to another implementation of the present disclosure.

As shown in FIG. 3, an implementation of the present disclosure further provides a data transmission device 300, which may include a processor 310, a transceiver 320. The data transmission device 300 may further include a storage 330, and may include a bus system 340. The processor 310, the transceiver 320 and the storage 330 may be connected via the bus system 340. The storage 330 is configured to store instructions, and the processor 310 is configured to execute instructions stored in the storage 330 to control the transceiver 320 to send and receive signals. The transceiver 320 is configured to receive a first signal sent by the second device. The processor 310 is configured to determine whether to send data according to the first signal.

Therefore, the data transmission device according to the implementations of the present disclosure sends data according to the first signal received from the second device, for example, sends data when the signal is stronger than a certain threshold, thereby saving the energy consumption of the device and improving the energy saving effect of the device.

It should be understood that, in the implementation of the present disclosure, the processor 310 may be a Central Processing Unit (CPU), or the processor 310 may be other general purpose processors, a Digital Signal Processor (DSP), an Application Specific Integrated Circuit (ASIC), a Field Programmable Gate Array (FPGA) or other programmable logic devices, a discrete gate or transistor logic device, or a discrete hardware component, etc. The general purpose processor may be a microprocessor, or the processor may be any conventional processor, or the like.

The storage 330 may include a read-only memory and a random access memory, and provide instructions and data to the processor 310. A portion of the storage 330 may also include a non-volatile random access memory. For example, the storage 330 may store information of a device type.

The bus system 340 may include a power bus, a control bus, a state signal bus or the like, in addition to a data bus. For clarity of illustration, various buses are designated as the bus system 340 in the figure.

In the implementation process, the steps of the above method may be accomplished by an integrated logic circuit of hardware or instructions in the form of software in the processor 310. The steps of the method disclosed in combination with the implementations of the present disclosure may be directly implemented by a hardware processor, or may be implemented by a combination of hardware and software modules in the processor. The software modules may be located in a random access memory, flash memory, read-only memory, programmable read-only memory or electrically erasable programmable memory, registers or other storage media developed in the art. The storage medium is located in the storage 330. The processor 310 reads the information in the storage 330 and completes the steps of the above method in combination with hardware. To avoid repetition, the steps will not be described here.

Optionally, the processor 310 is further configured to determine position information and/or signal strength information. The position information is used for indicating a position of the device, and the signal strength information is used for indicating strength of a second signal received by the device. The transceiver 320 is specifically configured to receive the first signal sent by the second device according to the position information and/or signal strength information.

Optionally, the processor 310 is specifically configured to determine the position information according to a GPS and/or a speed of the device.

Optionally, the transceiver 320 is specifically configured to determine a distance between the device and the second device according to the position information; and receive the first signal sent by the second device when determining that the distance between the device and the second device is less than or equal to a first threshold.

Optionally, the second signal is a GPS signal received by the device, or the second signal is a signal sent by an RSU, or the second signal is a signal sent by a base station. The RSU is an RSU of a terminal type or an RSU of a base station type.

Optionally, the transceiver 320 is specifically configured to receive the first signal sent by the second device when determining that the strength of the second signal is larger than or equal to a second threshold.

Optionally, the transceiver 320 is specifically configured to send the data to the second device when the signal strength of the first signal is larger than or equal to a third threshold; and not to send the data to the second device when the signal strength of the first signal is less than the third threshold.

Optionally, the transceiver 320 is specifically configured to periodically send the data to the second device according to a preset period value.

Optionally, the transceiver 320 is specifically configured to receive at least one period value sent by the network device. The processor 310 is specifically configured to determine a preset period value from the at least one period value according to the signal strength of the first signal or the distance between the device and the second device.

Optionally, the transceiver 320 is specifically configured to send the data to the second device according to resource information or resource pool information configured by the network device.

Optionally, the transceiver 320 is specifically configured to receive the first signal sent by the second device according to the resource information or the resource pool information configured by the network device.

Optionally, the device 300 is a user terminal, and the second device is a vehicle terminal or an RSU.

It should be understood that, the data transmission device 300 according to the implementations of the present disclosure may correspond to the data transmission device 200 in implementations of the present disclosure, and may correspond to the first device performing the method 100 in implementations of the present disclosure, and the above and other operations and/or functions of various parts in the device 300 are respectively for implementing the corresponding procedures of the method in FIG. 1, which are not repeated here for conciseness.

Therefore, the data transmission device according to implementations of the present disclosure determines whether to receive the first signal sent by the second device based on its own position information or the strength of a signal that can be received, and then sends data according to the first signal received from the second device, for example, sends data when the signal is stronger than a certain threshold. Therefore, the energy consumption of the user terminal can be saved, and the energy saving effect of the user terminal can be improved.

Those of ordinary skill in the art may understand that the exemplary elements and algorithm steps described in combination with the implementations disclosed herein may be implemented in electronic hardware, or a combination of computer software and electronic hardware. Whether these functions are implemented in hardware or software depends on the specific application scenario and design constraints of the technical scheme. Skilled artisans may use different methods to implement the described functions for each particular application scenario, but such implementation should not be deemed to be beyond the scope of the present disclosure.

Those skilled in the art may clearly understand that for convenience and conciseness of description, the specific working processes of the system, device and unit described above may refer to the corresponding process in the above-described method implementation, which is not repeated here.

In several implementations provided in the present application, it should be understood that, the disclosed system, device, and method may be implemented in other ways. For example, the device implementations described above are only exemplary, for example, the division of the units is only a logical function division, and there may be other division modes in actual implementation, for example, multiple units or components may be combined or integrated into another system, or some features may be ignored or not executed. On the other hand, the mutual coupling or direct coupling or communication connection shown or discussed may be indirect coupling or communication connection through some interfaces, devices or units, and may be in electrical, mechanical or other forms.

The unit described as a separate part may or may not be physically separated, and the part shown as a unit may or may not be a physical unit, i.e., may be located in one place or may be distributed over multiple network units. Some or all of the units may be selected according to actual demands to achieve the purpose of the implementation.

In addition, functional units in various implementations of the present disclosure may be integrated in one processing unit, or each unit may be physically present individually, or two or more units may be integrated in one unit.

The functions may be stored in a computer readable storage medium if implemented in the form of software functional units and sold or used as separate products. Based on such understanding, the technical scheme of the present disclosure, in essence, or the part contributing to the prior art, or the part of the technical scheme, may be embodied in the form of a software product. The software product is stored in a storage medium and includes a quantity of instructions for causing a computer device (which may be a personal computer, a server, or a network device, etc.) to implement all or part of the steps of the method described in various implementations of the present disclosure. The aforementioned storage medium includes various media capable of storing program code, such as a U disk, a mobile hard disk, a read-only memory, a random access memory, a magnetic disk, or an optical disk.

The foregoing is only specific implementations of the present disclosure, but the scope of protection of the present disclosure is not limited thereto. Variations or substitutions which may easily be conceived within the technical scope disclosed by the present disclosure by any person skilled in the art shall fall within the scope of protection of the present disclosure. Therefore, the scope of protection of the present disclosure should be subjected to the scope of protection of the claims.

What is claimed is:

1. A method for data transmission, comprising:
   receiving, by a first device, a first signal sent by a second device; and
   determining, by the first device, whether to send data according to the first signal;
   wherein receiving, by the first device, the first signal sent by the second device comprises:
   determining, by the first device, position information, or signal strength information, or position information and signal strength information, wherein the position information is used for indicating a position of the first device, and the signal strength information is used for indicating strength of a second signal received by the first device; and receiving, by the first device, the first signal sent by the second device according to the position information, or the signal strength information, or the position information and the signal strength information;
   wherein receiving, by the first device, the first signal sent by the second device according to the position information comprises: determining, by the first device, a distance between the first device and the second device according to the position information; receiving, by the first device, the first signal sent by the second device when determining that the distance between the first device and the second device is less than or equal to a first threshold; or
   wherein receiving, by the first device, the first signal sent by the second device according to the signal strength information comprises: receiving, by the first device, the first signal sent by the second device when determining that the strength of the second signal is larger than or equal to a second threshold.

2. The method according to claim 1, wherein determining, by the first device, the position information comprises:
   determining, by the first device, the position information according to a Global Positioning System (GPS), or a speed of the first device, or a GPS and a speed of the first device.

3. The method according to claim 1, wherein,
   the second signal is a Global Positioning System (GPS) signal received by the first device; or
   the second signal is a signal sent by a Road Side Unit (RSU); or
   the second signal is a signal sent by a base station;
   wherein the RSU is an RSU of a terminal type or an RSU of a base station type.

4. The method according to claim 1, wherein determining, by the first device, whether to send data according to the first signal comprises:
   sending, by the first device, the data to the second device when signal strength of the first signal is larger than or equal to a third threshold; and
   not sending, by the first device, the data to the second device when the signal strength of the first signal is less than the third threshold.

5. The method according to claim 4, wherein sending, by the first device, the data to the second device comprises:
   sending, by the first device, the data to the second device periodically according to a preset period value.

6. The method according to claim 5, wherein the method further comprises:
receiving, by the first device, at least one period value sent by a network device; and
determining, by the first device, the preset period value from the at least one period value according to the signal strength of the first signal or a distance between the first device and the second device.

7. The method according to claim 1, wherein sending, by the first device, the data to the second device comprises:
sending, by the first device, the data to the second device according to resource information or resource pool information configured by a network device; or
wherein receiving, by the first device, the first signal sent by the second device comprises:
receiving, by the first device, the first signal sent by the second device according to resource information or resource pool information configured by a network device.

8. The method according to claim 1, wherein the first device is a user terminal, and the second device is a vehicle terminal, or a Road Side Unit (RSU), or a network base station.

9. The method according to claim 1, wherein the first signal is a detection signal periodically sent by the second device, or a signal carrying signaling information of the second device, or a signal carrying data information of the second device.

10. A data transmission device, comprising:
a transceiver configured to receive a first signal sent by a second device; and
a processor configured to determine whether to send data according to the first signal; wherein the processor is further configured to: determine position information, or signal strength information, or position information and signal strength information, wherein the position information is used for indicating a position of the device, and the signal strength information is used for indicating strength of a second signal received by the device; and the transceiver is further configured to: receive the first signal sent by the second device according to the position information, or the signal strength information, or the position information and the signal strength information;
wherein the transceiver is further configured to: determine a distance between the device and the second device according to the position information;
receive the first signal sent by the second device when determining that the distance between the device and the second device is less than or equal to a first threshold; or
the transceiver is configured to receive the first signal sent by the second device, when the processor determines that the strength of the second signal is larger than or equal to a second threshold.

11. The device according to claim 10,
wherein the second signal is a Global Positioning System (GPS) signal received by the device; or
the second signal is a signal sent by a Road Side Unit (RSU), wherein the RSU is an RSU of a terminal type or an RSU of a base station type; or
the second signal is a signal sent by a base station.

12. The device according to claim 10, wherein the processor is further configured to:
determine the position information according to a Global Positioning System (GPS), or a speed of the device, or a GPS and a speed of the device.

13. The device according to claim 10, wherein the transceiver is further configured to:
send the data to the second device when signal strength of the first signal is larger than or equal to a third threshold; and
not send the data to the second device when the signal strength of the first signal is less than the third threshold.

14. The device according to claim 13, wherein the transceiver is further configured to:
send the data to the second device periodically according to a preset period value;
wherein the transceiver is configured to:
receive at least one period value sent by a network device; and
the processor is configured to:
determine the preset period value from the at least one period value according to the signal strength of the first signal or a distance between the device and the second device.

15. The device according to claim 10, wherein the transceiver is further configured to:
send the data to the second device according to resource information or resource pool information configured by a network device; or
receive the first signal sent by the second device according to resource information or resource pool information configured by a network device.

16. The device according to claim 10, wherein the device is a user terminal, and the second device is a vehicle terminal or a Road Side Unit (RSU).

17. A computer readable medium, comprising:
a computer program, wherein the computer program comprises instructions that are executable by a computer to perform steps of:
receiving a first signal sent by a second device; and
determining whether to send data according to the first signal;
wherein receiving the first signal sent by the second device comprises:
determining position information, or signal strength information, or position information and signal strength information, wherein the position information is used for indicating a position of the first device, and the signal strength information is used for indicating strength of a second signal received by the first device; and receiving the first signal sent by the second device according to the position information, or the signal strength information, or the position information and the signal strength information;
wherein receiving the first signal sent by the second device according to the position information comprises: determining a distance between the first device and the second device according to the position information; receiving the first signal sent by the second device when determining that the distance between the first device and the second device is less than or equal to a first threshold; or
wherein receiving the first signal sent by the second device according to the signal strength information comprises: receiving the first signal sent by the second device when determining that the strength of the second signal is larger than or equal to a second threshold.

* * * * *